DIRECT CURRENT RESTORATION CIRCUITS

Filed Nov. 26, 1952 2 Sheets-Sheet 1

Inventor:
Henry E. Revercomb,
by Merton D. Moore
His Attorney.

March 4, 1958 H. E. REVERCOMB 2,825,758

DIRECT CURRENT RESTORATION CIRCUITS

Filed Nov. 26, 1952 2 Sheets-Sheet 2

Inventor:
Henry E. Revercomb,
by Merton D. Moore
His Attorney.

United States Patent Office 2,825,758

Patented Mar. 4, 1958

2,825,758

DIRECT CURRENT RESTORATION CIRCUITS

Henry E. Revercomb, Syracuse, N. Y., assignor to General Electric Company, a corporation of New York Application November 26, 1952, Serial No. 322,743

2 Claims. (Cl. 178—7.5)

The present invention relates to circuits of the type commonly called direct current restoration circuits. Such circuits are used for the restoration of unidirectional and slowly-varying components of complex signal waves. More specifically, my invention relates to circuits for automatically deriving a unidirectional or slowly-varying voltage component from information contained in the alternating voltage components of a composite signal wave and for applying the unidirectional voltage component thus derived to the input electrode system of a cathode-ray tube or the like. The invention has particular application to television receiving apparatus and the like employing circuits for restoring the unidirectional voltage component representing the average scene brightness of a television picture.

The unidirectional or slowly-varying voltage component mentioned above is hereinafter referred to by the commonly applied term, D.-C. component.

In accordance with present-day television broadcasting standards in the United States of America, negative amplitude modulation of the video carrier wave is employed to transmit the picture information, and the average brightness of the televised scene is represented in the composite signal wave by the so-called D.-C. component whose amplitude varies inversely with the picture brightness. Total blackness is represented by a signal whose amplitude is 75 percent of the full signal amplitude. Thus, blackness corresponds to 75 percent negative modulation of the carrier wave. The background brightness reference level, namely the 75 percent signal amplitude level, is also the level at which the blanking pulses are transmitted. The region between 75 percent and 100 percent of maximum signal amplitude is known as the "blacker than black" region and is utilized for transmitting the horizontal and vertical synchronizing pulses.

Another function of the D.-C. component is to establish a fixed reference level for the synchronization pulses in order to permit the use of an amplitude separator to remove the synchronization pulses from the signal wave applied to the control element of the picture tube.

As is well-known, television receiving apparatus currently employed usually contains in its circuitry one or more interstage coupling devices such as a capacitor, over which the D.-C. component is not transmitted. Hence, it is necessary to restore the D.-C. component to the picture signal as applied to the control element of the picture tube in order to insure a true reproduction of the average scene brightness of the scene portrayed.

A well-known and simple method of restoring the D.-C. component to the composite signal wave is by the use of a diode detector circuit, such as a peak detector, to rectify the alternating signal component and produce a varying unidirectional voltage. Although diode detectors provide a simple method of restoring the D.-C. component, they are not without limitations. A major difficulty is that they usually detect some or all of the synchronization pulses along with the desired signal wave and, hence, introduce an error in the D.-C. component. Another difficulty is their sensitivity to interfering noise transients.

To eliminate the error produced by the synchronization pulses, D.-C. restorers have been designed which are keyed by the complex signal wave in such a manner as to be rendered inoperative during the synchronization pulses. These keyed restorers detect only a selecting portion of a complex wave, usually at the blanking level. However, the keyed restorer requires that the keying pulses be synchronous with a selected cyclical portion of the complex signal wave and, since the synchronization requirements are rather critical, it often imposes a considerable difficulty to achieve satisfactory results.

An effective method employed in unkeyed restoration circuits to reduce the effect of the synchronization pulses and to eliminate high-frequency noise pulses as well, is to provide an integration circuit to filter out the high-frequency synchronization pulses and noise pulses that would otherwise produce an error in the background reference level. However, a remaining difficulty in certain of the integration-type unkeyed restoration circuits is that an error is introduced into the restored D.-C. component by the voltage drop due to current flow across a cathode bias resistor in the driving circuit of the picture tube.

It is an object of the present invention to provide an improved circuit for restoring and stabilizing a varying unidirectional voltage component to a composite signal wave applied to the input electrode system of a cathode-ray tube or the like.

It is another object of the present invention to provide an improved unkeyed D.-C. component restoration circuit of the integration type in which compensation is provided for fluctuations in the D.-C. component level due to the flow of cathode current in a television picture tube or the like.

It is another object of the present invention to provide an improved D.-C. component restoration circuit having a separate bias supply for establishing the operating bias potential of the signal input electrode system of a television picture tube or the like, in which compensation is provided for restoration error due to the flow of cathode current in the picture tube.

Briefly stated, in accordance with one aspect of the present invention, there is provided an improved D.-C. restorer comprising an integrator and a detector which features stabilization of the dynamic reference level of the D.-C. component as applied to the control electrode system of a cathode-ray device or the like. This stabilization is accomplished by the application to the signal input terminals of the restorer of a predetermined portion of the reference level fluctuations produced by the flow of cathode current across the cathode impedance element of the cathode-ray device in order substantially to neutralize the effect of these fluctuations on the control electrode system of the device.

For additional objects and advantages, and for a better understanding of the invention, attention is now directed to the following description and accompanying drawings. The features of the invention which are believed to be novel are particularly pointed out in the appended claims.

In the drawings.

Corresponding elements of the various figures bear identical numerical designations.

Figure 1:
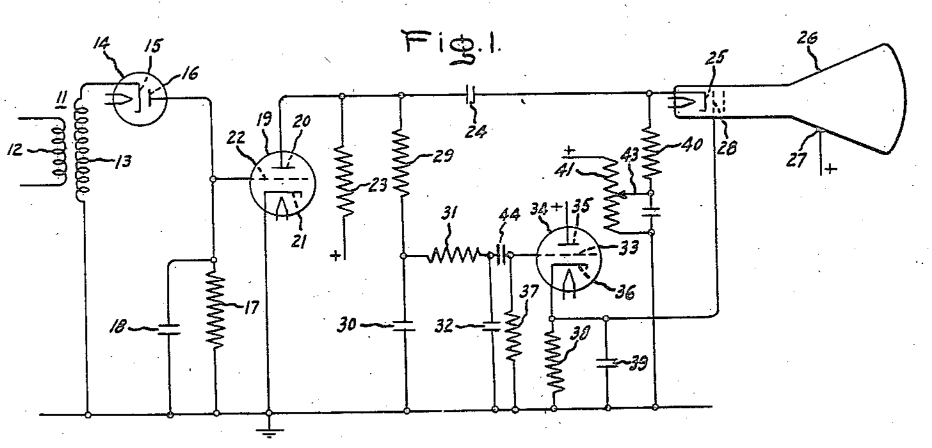
Fig. 1 is a schematic circuit diagram of a portion of a television receiving apparatus including a well-known integration type of D.-C. restoration circuit.
Figure 2:
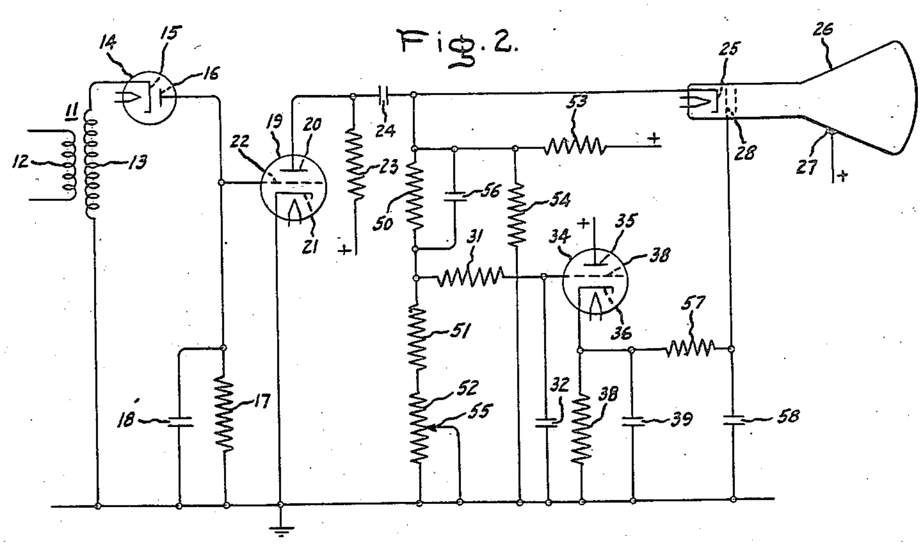
Fig. 2 is a schematic circuit diagram of a portion of a television receiving apparatus similar to that shown in Fig. 1, but embodying one form of the present invention.
Figure 3:
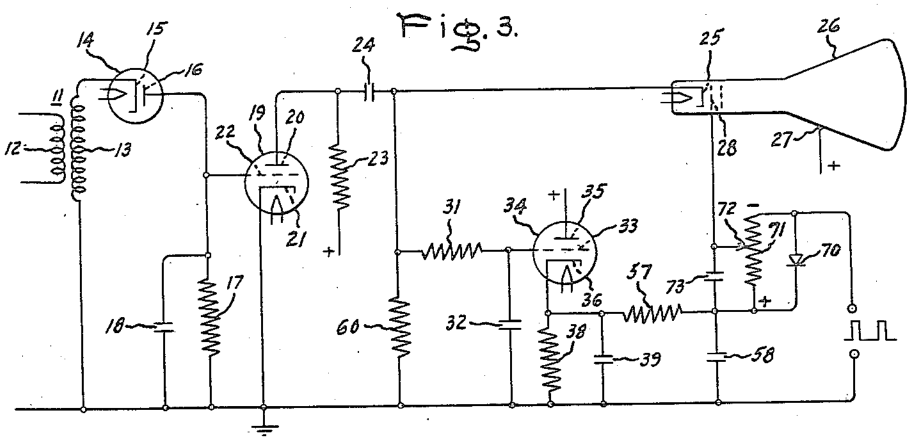
Fig. 3 is a schematic circuit diagram of a portion of a television receiving apparatus similar to that shown in Fig. 1, but embodying another form of the present invention.

As an aid to a better understanding of the circuits shown in Figs. 2 and 3, there is shown in Fig. 1 a portion of a conventional television receiving apparatus. The circuit of Fig. 1 includes a conventional final detector and video amplifier and an integration type D.-C. restorer known in the art.

Referring now to Fig. 1, there is shown a coupling transformer 11 having a primary winding 12 and a secondary winding 13. The primary 12 is connected to a source (not shown) of amplitude-modulated waves such as an intermediate-frequency amplifier. The secondary 13 is connected to a diode detector circuit including a diode device 14 having a cathode 15 and an anode 16. One end of secondary 13 is connected to the cathode 15 and the other end of winding 13 is connected to common ground. The anode 16 is connected to a diode load resistor 17 having its other end connected to common ground. A diode load by-pass capacitor 18 is connected across resistor 17 in conventional manner. The output of the diode detector circuit which appears across the load resistor 17 and capacitor 18 is coupled directly to a video amplifier comprising electron discharge device 19. Device 19 may conveniently be of the triode type as shown, comprising an anode 20, a cathode 21 and a control electrode 22. The coupling from detector 14 to amplifier 19 is accomplished by means of a direct connection from anode 16 to control grid 22. The cathode 21 is connected directly to ground. The anode 20 is connected through a load resistor 23 to the positive side of a source of operating potential (not shown) having its negative terminal connected to ground. The anode 20 is also connected through a coupling capacitor 24 to the cathode 25 of a cathode-ray type picture tube 26. Picture device 26 is of conventional design and in addition to the cathode 25, it comprises a conventional cathode-ray electrode system including a high-voltage anode connection 27 and a control electrode 28.

An integration circuit comprising a resistor 29 and a capacitor 30 is connected across the output of amplifier 19. More specifically, the resistor 29 has one terminal connected to anode 20 and its other terminal connected to one side of the capacitor 30 which has its remaining side connected to common ground. The output of the above integration circuit is connected to a second integration circuit comprising a resistor 31 and a capacitor 32. The resistor 31 has one terminal connected to the junction between resistor 29 and capacitor 30 and a second terminal connected to ground through capacitor 32. The junction between resistor 31 and capacitor 32 is coupled through a coupling capacitor 44 to the control electrode 33 of an electron discharge device 34. Device 34, which may be a conventional triode device as shown, also comprises an anode 35 and a cathode 36. Device 34 is connected in a conventional grid-leak power detector circuit. A grid bias resistor 37 is connected between grid 33 and ground. The anode 35 is connected to the positive side of a suitable source of operating potential. The cathode 36 is connected to ground through a high-impedance resistor 38. A by-pass capacitor 39 is connected across resistor 38 to ground. Resistor 38 and capacitor 39 function as the load impedance elements of the restorer detector circuit comprising device 34. The output of the restorer detector circuit, which appears across resistor 38 in parallel with capacitor 39, is fed to the picture tube 26 by means of a direct connection from the cathode 36 of device 34 to the control electrode 28 of the picture tube 26.

Operating grid bias for the picture tube 26 is conventionally provided by means of a cathode resistor 40 which is connected from the cathode 25 to a suitable tap 43 on a voltage-dividing resistor 41. Resistor 41 has one terminal connected to the positive side of the source and its other terminal connected to ground. A by-pass capacitor 42 is provided from the tap 43 on resistor 41 to ground. Capacitor 42 provides a conventional shunt path across the bias voltage portion of resistor 41 to ground. Thus, the cathode 25 is provided with self-bias by a voltage across the resistor 40 produced by cathode current flow through resistor 40 and in addition to the self-bias, an adjustable bias is provided by the source through the operative portion of potentiometer 41.

Briefly stated, the operation of the above-described prior art circuit is as follows:

A signal-modulated carrier wave is coupled to the detector device 14 by means of the transformer 11. The output of the detector appears across resistor 17 with respect to ground. In accordance with present-day standards as mentioned above, the polarity of the detected signal wave is such that the anode 16 of device 14 will become more negative in potential as the amplitude of the synchronization pulses increases. Thus, it may be said that the detector output appears across resistor 17 with the synchronization pulses in a negative-going sense. However, it is necessary, according to well-known principles, to supply video signals to the cathode 25 of the cathode-ray tube 26 in which the synchronization pulses are positive-going. This is accomplished by the amplifier 19 which inverts the phase of the signal in well-known manner. Thus, the output of amplifier 19 appearing across load resistor 23 is such that the synchronization pulses are positive-going in polarity. Since the output of the amplifier 19 is coupled by means of capacitor 24 to the cathode 25 of the cathode-ray tube 26, it is apparent that the D.-C. component of the detected signal wave is lost across the capacitor 24. However, the double integration circuit comprising elements 29—32 is of proper value substantially to eliminate all high-frequency synchronization and noise components from the video signal output of the amplifier 19 and to supply the remaining low-frequency variations, viz. the vertical blanking pulses which correspond to true black level, to the control grid of the restoration detector 34. The restoration detector output is derived across the load circuit comprising resistor 38 and capacitor 39 in parallel and is supplied to the control grid 28 of the picture tube 26. Tube 34 actually conducts during the vertical blanking pulse so condenser 39 must be made large enough to smooth out the pulsations occurring 60 times per second.

While the restorer-detector, in cooperation with the integration circuits, provides a varying D.-C. component corresponding to "black level" whose value fluctuates in accordance with the brightness and low frequency components of the signal wave, it is nevertheless necessary to supply in addition a bias potential to set the proper operating level for the D.-C. component. This is accomplished by means of the cathode resistor 40 and the operative portion of the voltage divider 41. The presence of this circuit, however, introduces an error in the restoration signal. During the normal operation of the picture tube 26, the picture tube beam current, frequently referred to as the cathode current, flows through the resistor 40 and consequently produces a voltage drop across that element which tends to alter the D.-C. level established between grid 28 and cathode 25 by the restoration circuit. By making resistor 40 of very low value and capacitor 42 of very large value, it is possible to reduce this error. However, it is not generally possible to reduce it sufficiently in practice. To illustrate, a typical value for resistor 40 is 220,000 ohms and for capacitor 42, 0.1 microfarad. With a picture tube beam current of 50 microamperes, this would give an error in the restoration level of 11 volts. With a typical video output signal of 50 volts, the the error would thus be appreciable. The circuits illustrated in the Figs. 2 and 3 are particularly designated to overcome this difficulty.

In Fig. 2, there is shown a circuit which is similar to the circuit shown in Fig. 1 but which differs in the following respects. The integration circuit comprising resistor 29 and capacitor 30 has been eliminated. The cathode-ray tube biasing circuit comprising elements 40—43 has been replaced by a cathode biasing network which includes a voltage divider comprising three serially-connected resistors 50, 51 and 52, a line dropping resistor 53, and a stabilizing resistor 54. This biasing network is connected between the cathode 25 of the cathode-ray tube 26 and ground and is separated from the amplifier 19 by the coupling capacitor 24. More specifically, the biasing circuit is arranged as follows. Resistor 50 has a first end connected to cathode 25 and a second end connected to one terminal of resistor 51. The second terminal of resistor 51 is connected to one side of resistor 52 having its second side connected to ground. A variable tap 55 is provided on resistor 52 and is connected to ground in order to permit manual adjustment of the bias of the network. Line-dropping resistor 53 has one terminal thereof connected to the positive side of the source and its other terminal connected to the cathode 25. Stabilizing resistor 54 is connected between cathode 25 and ground. A by-pass capacitor 56 connects the cathode 25 to the junction between resistors 50 and 51. Its purpose is to provide a path for signal waves from the amplifier 19 to an integration circuit comprising resistor 31 and capacitor 32, as in the preceding figure, and which in the present figure is connected between the junction of resistors 50 and 51 and ground. The output of the integration circuit is fed to the detector device 34 which corresponds to the detector of the preceding figure.

One other difference exists between the circuits shown in Figs. 1 and 2, namely the addition in the circuit of Fig. 2 of another filter section to the output of the restorer detector 34. This additional filter section comprises a resistor 57 connected between the cathode 36 of the detector and the control grid 28 of a cathode-ray tube and a capacitor 58 connected between the control grid 28 and ground.

The operation of the circuit shown in Fig. 2 is as follows: The output of the video amplifier, which appears across the load resistor 23, is transmitted through the coupling capacitor 24 to the cathode of the picture tube 26. The output of the amplifier 19 is also supplied through capacitor 56 to the integration circuit comprising resistor 31 and capacitor 32 which substantially eliminates the high-frequency synchronizing pulses as described in the preceding figure. The use of a single integration circuit 31, 32 rather than a double integration circuit 29—32 as in the preceding figure provides a lesser degree of filtering and is not otherwise of importance. Hence, a double integration circuit may, if desired, be employed in the circuit shown in Fig. 2. The detector comprising device 34 operates in substantially the same manner as Fig. 1 and its output is fed to the grid of the cathode-ray tube 26 in a manner similar to that of Fig. 1. The additional filter section 57, 58 tends further to smooth the detector output wave, but in certain applications, a single filter section may be sufficient.

In the circuit of Fig. 2, resistors 53 and 54 are, in effect, a voltage divider connected across the source to ground. The output of this divider which appears at the junction of the two resistors named is supplied to the voltage divider including resistors 50–52, inclusive. In this manner, the static bias level of the cathode 25 of the cathode-ray tube is established. However, as cathode current flows in the cathode-ray tube 26 under normal operating conditions a voltage drop occurs across the voltage divider 50–52 which introduces an undesirable positive bias from the cathode 25. However, since the integration circuit which supplies the detector 34 is connected to the voltage divider 50–52, it is apparent that the control grid 33 of the detector will likewise be affected by any flow of current in the voltage divider 50–52, but to a lesser degree, as determined by the voltage dividing ration of resistor 50 to resistors 51 and 52. Since the output voltage of the detector appearing across the detector load resistor 38 is in phase with the voltage applied to its grid 33, it is clear that the voltage on the grid 28 of the cathode-ray tube 26 will likewise rise in proportion to the voltage of the cathode 25. Thus, it is possible greatly to reduce the unwanted bias from the cathode 25 to cathode current flow, by causing the bias voltage on grid 28 to increase in similar manner. The variable tap 55 is provided on the resistor 52 in order to adjust the potential appearing across the voltage divider 52 to enable the establishment of the desired operating bias level on the cathode 25.

The circuit shown in Fig. 3 is similar to that of Fig. 2. However, the biasing network 50—55 of Fig. 2 has been replaced by a single cathode resistor 60 between cathode 25 and ground. The biasing level of the circuit shown in Fig. 3 is established by means of an auxiliary bias circuit connected in series with the output voltage of the restorer detector. Specifically, this separate bias circuit includes a diode rectifier element 70, which may be of the barrier layer type as shown in the diagram, connected in series with the capacitor 58 across a source of potential which may, for instance, consist of pulses derived from the horizontal sweep circuit. For example, these pulses may conventionally be obtained by means of an extra winding on the width control or a tap on the horizontal sweep transformer (not shown). The rectifier circuit including device 70 is a conventional diode-type rectifier in which a potentiometer 71 and a capacitor 73 serve as the rectifier load elements. A portion of the bias voltage developed across potentiometer 71 is impressed on control grid 28 from a tap connection 72.

In the modified circuit of Fig. 3, the integration circuit 31—32 remains connected between cathode 25 and ground, as in Fig. 2. The restoration detector 34 and its associated circuit are identical to that of Fig. 2.

The circuit of Fig. 3 provides means for applying all of the cathode current developed across cathode resistor 60 to the grid of detector tube 34. Thus, all of the error due to cathode current flow may be fed back to the control grid of the cathode-ray tube. In this modification, the operating level bias of the cathode-ray tube is supplied by means of the auxiliary detector circuit in series with the output of the restorer detector circuit and may be separately adjusted.

An increase in cathode-to-ground voltage biases the picture tube grid more positively in polarity by the amount required to allow the black level in the picture signal to swing the instantaneous grid-cathode voltage of device 26 just to cut-off to bring the light output just to black, thus giving the desired D. C. restoration with good accuracy.

While specific embodiments have been shown and described, it will of course be understood that various modifications may be made without departing from the principles of the invention. The appended claims are therefore intended to cover any such modifications within the true spirit and scope of the invention.

What I claim as new and desire to secure by Letters Patent of the United States is:

1. In combination, a cathode ray tube having a control grid, a cathode and an anode, a source of video signals having positive synchronizing pulses, means for alternating current coupling said source to said cathode, a D.-C. current path including a cathode impedance connected between said cathode and a point of fixed potential, an amplifier having a plate, a grid and a cathode, an integration circuit having its input connected to a point on said cathode impedance and its output applied to the grid of said amplifier, and means for coupling said cathode of said amplifier to said grid of said cathode ray tube, the input connnection of said integrating circuit being connected to a point on said cathode impedance so chosen that the error in the D.-C. level of the cathode ray tube circuit caused by the voltage drop across said cathode impedance is compensated for by the application of a portion of said drop to the cathode ray tube grid.

2. In combination, a cathode ray tube having an anode, a control grid and a cathode, a source of video signals having positive synchronizing pulses, means for alternating current coupling said source to said cathode, a resistance connected between said cathode and a point of fixed reference potential, means for applying a given positive potential to said cathode, an amplifier having a plate, a grid, and a cathode, a first integration circuit having its input connected to a point on said resistance and its output applied to the grid of said amplifier, and means including a second integrating circuit for coupling the cathode of said amplifier to the grid of said cathode ray tube, the input connection of said first integrating circuit being connected to a point on said resistance so chosen that the error in D.-C. level of the cathode ray tube circuit caused by the voltage drop across said resistance is compensated for by the application of a portion of said drop to the cathode ray tube grid.

References Cited in the file of this patent

UNITED STATES PATENTS

| | | |
|---|---|---|
| 2,116,671 | Dowsett | May 10, 1938 |
| 2,240,281 | Ballard | Apr. 29, 1941 |
| 2,255,485 | Dome | Sept. 9, 1941 |
| 2,259,538 | Wheeler | Oct. 21, 1941 |
| 2,522,967 | Shaw | Sept. 19, 1950 |
| 2,564,554 | Anderson | Aug. 14, 1951 |
| 2,673,892 | Richman | Mar. 30, 1954 |

FOREIGN PATENTS

| | | |
|---|---|---|
| 641,949 | Great Britain | Aug. 23, 1950 |